(12) United States Patent
Mathur et al.

(10) Patent No.: US 9,158,477 B2
(45) Date of Patent: Oct. 13, 2015

(54) PREVENTING ACCESS LOSS WHEN DEVICE ADAPTER AFFINITY TO A NODE CHANGES

(71) Applicant: International Business Machines Corporation, Armonk, NY (US)

(72) Inventors: Anjul Mathur, Tucson, AZ (US); Karl A. Nielsen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 285 days.

(21) Appl. No.: 13/652,008

(22) Filed: Oct. 15, 2012

(65) Prior Publication Data

US 2014/0108724 A1    Apr. 17, 2014

(51) Int. Cl.
*G06F 3/06* (2006.01)
*G06F 11/20* (2006.01)

(52) U.S. Cl.
CPC .............. *G06F 3/0689* (2013.01); *G06F 3/067* (2013.01); *G06F 3/0617* (2013.01); *G06F 3/0634* (2013.01); *G06F 11/2033* (2013.01)

(58) Field of Classification Search
CPC . G06F 11/0751; G06F 3/0671; G06F 3/0634; G06F 3/067; G06F 11/2033
USPC .......................................................... 711/114
See application file for complete search history.

(56) References Cited

U.S. PATENT DOCUMENTS

| | | | |
|---|---|---|---|
| 6,996,741 B1 * | 2/2006 | Pittelkow et al. | 714/5.11 |
| 2006/0251014 A1 | 11/2006 | Castor et al. | |
| 2009/0046767 A1 | 2/2009 | Tinnakornsrisuphap et al. | |
| 2009/0319699 A1 | 12/2009 | Canto et al. | |
| 2011/0047268 A1 | 2/2011 | Mirza | |

FOREIGN PATENT DOCUMENTS

| | | |
|---|---|---|
| DE | 19725388 | 12/1998 |
| EP | 1 653 675 | 3/2006 |
| JP | 2003232943 | 8/2003 |

OTHER PUBLICATIONS

IBM Corp., "Dynamic Reconfiguration of Registers in Multi-Node Systems", IP.com PriorArtDatabase, Technical Disclosure, IP.com Document No. IPCOM000127245D, Aug. 18, 2005, 4 pp.
English machine translation of Japanese Patent No. JP2003-232943, published Aug. 22, 2008, 18 pp.

* cited by examiner

*Primary Examiner* — Kalpit Parikh
(74) *Attorney, Agent, or Firm* — Janaki K. Davda; Konrad Raynes Davda & Victor LLP (57) ABSTRACT

Provided are a computer implemented method, computer program product, and system for maintaining state information. An available node affiliated with an unavailable device adapter and an unavailable node affiliated with an available device adapter are identified, wherein the available node is assigned a first subset of disk arrays, and wherein the unavailable node is assigned a second subset of disk arrays. The available device adapter is affiliated with the available node. First state information of the first node that describes a state of the first subset of disk arrays is updated with second state information of the second node that describes a state of the second subset of disk arrays. Access to the first subset of disk arrays and the second subset of disk arrays is provided through the available node and the available device adapter using the updated first state information.

18 Claims, 5 Drawing Sheets

FIG. 5

PREVENTING ACCESS LOSS WHEN DEVICE ADAPTER AFFINITY TO A NODE CHANGES

FIELD

Embodiments of the invention relate to preventing access loss when device adapter affinity to a node changes.

BACKGROUND

In a storage subsystem, with two or more nodes, each node owns device adapters. A node includes a processor and a storage subsystem. The storage subsystem manages access to a storage space (e.g., hard disk drives, otherwise referred to as a Direct Access Storage Device (DASD)).

Disk arrays are configured on each device adapter and, hence, disk arrays are owned by each node. Host Input/Output (I/O) runs on logical volumes configured on the disk arrays.

Sometimes (e.g., failover), a device adapter moves from a first node to a second (new) node, and there is a period of time when underlying disk arrays of the first node are inaccessible because the device adapter state has not been re-established on the second node. In this period, when the disk arrays are inaccessible, no host I/O runs to volumes on those inaccessible disk arrays (i.e., there is a temporary loss of access).

Some systems depend on re-establishing device adapter state after the device adapter moves to second new node. With this, there is a temporary loss of access to volumes until the device adapter state is re-established on the new node.

SUMMARY

Provided are a computer implemented method, computer program product, and system for maintaining state information. An available node affiliated with an unavailable device adapter and an unavailable node affiliated with an available device adapter are identified, wherein the available node is assigned a first subset of disk arrays, and wherein the unavailable node is assigned a second subset of disk arrays. The available device adapter is affiliated with the available node. First state information of the first node that describes a state of the first subset of disk arrays is updated with second state information of the second node that describes a state of the second subset of disk arrays. Access to the first subset of disk arrays and the second subset of disk arrays is provided through the available node and the available device adapter using the updated first state information.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments ensure that disk arrays are accessible at all times, without loss of access when device adapter affinity changes from one node to another node.

Figure 1:
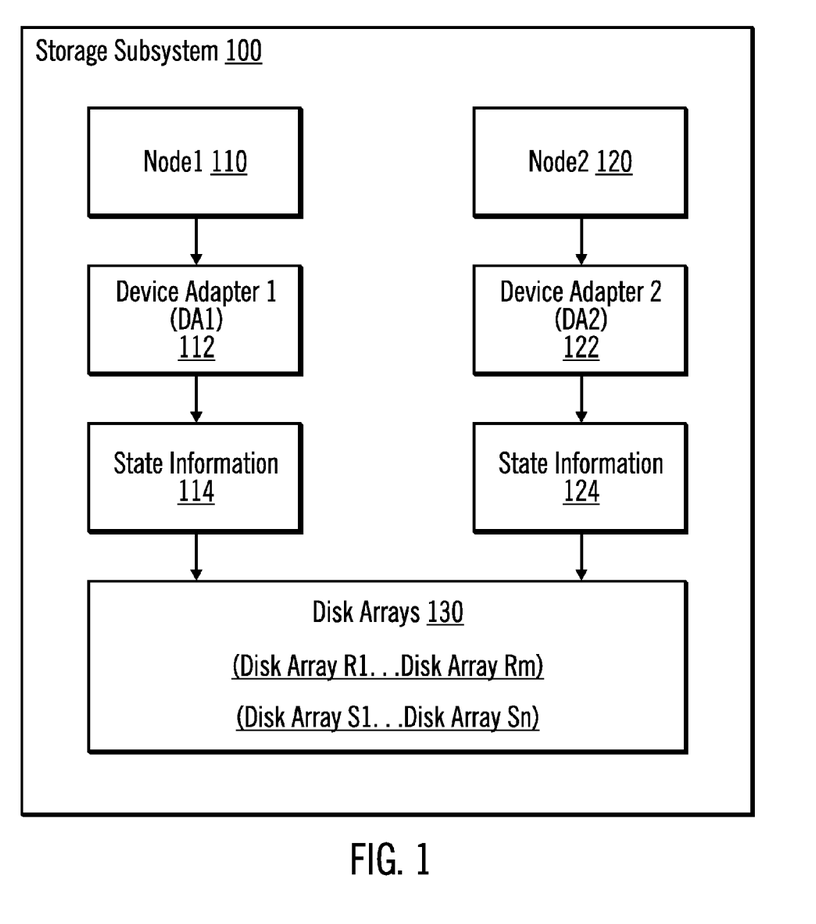
FIG. 1 illustrates, in a block diagram, a storage subsystem in accordance with certain alternative embodiments.

FIG. 1 illustrates, in a block diagram, a storage subsystem 100 in accordance with certain alternative embodiments. The storage subsystem 100 has two nodes 110, 120 and one device adapter pair 112, 122. The device adapters 112, 122 are on different nodes 110, 120 (i.e., have affinity to different nodes 110, 120). At any time, either DA1 112 or DA2 122 is on an operating node 110, 120. Disk arrays 130 on the device adapter pair (DA1 112, DA2 122) may be owned by either node1 110 or node2 120. In certain embodiments, each node 110, 120 in the storage subsystem 100 owns a subset of the disk arrays. In FIG. 1, one subset of disk arrays are Disk Array R1 . . . Disk Array Rm and another subset of disk arrays are Disk Array S1 . . . Disk Array Sn, where "m" and "n" are integers and may be the same or different values. In certain embodiments, all disk arrays are assigned to an operating node. In certain alternative embodiments, there may be disk arrays that are not assigned to an operating node (e.g., backup disk arrays that may be assigned to an operating node if a previously assigned disk array for that node goes offline or is otherwise unavailable).

In the storage subsystem 100, node1 110 is coupled to device adapter 1 (DA1) 112. It may be said that DA1 112 has an affinity to node1 110 and accesses a first subset of the disk arrays 130 (e.g., Disk Array R1 . . . Disk Array Rm). DA1 112 stores state information 114, which includes information about the state of the DA1 112 and state information about the first subset of disk arrays 130 configured for DA1 112. In certain embodiments, the state information about the disk arrays 130 indicates for each disk array whether that disk array is accessible, inaccessible, offline, unconfigured, etc.

In addition, in the storage subsystem 100, node2 120 is coupled to device adapter 2 (DAs) 122. It may be said that DA2 122 has an affinity to nodes 120 and accesses a second subset of the disk arrays 130 (e.g., Disk Array S1 . . . Disk Array Sn). DA2 122 stores state information 124, which includes information about the state of the DA2 122 and state information about the second subset of the disk arrays 130 configured for DA2 122.

Thus, in a good storage system state, DA1 112 is owned by node1 110 and DA2 122 is owned by node2 120. The disk arrays 130 are accessible by both DA1 112 and DA2 122 from both the nodes 110, 120. However, in an error state, when (1) one of the nodes becomes unavailable (e.g., failed or has been taken off-line for maintenance, etc.) and is affiliated with an available device adapter and (2) another, available node (i.e., a surviving node) is affiliated with an unavailable device adapter, then the available node becomes affiliated with the available device adapter. At this point, the available node owns the subset of disk arrays already assigned to the available node and owns the subset of disk arrays owned by the unavailable node. These subsets of disk arrays are now accessed via the available node and the available device adapter.

Figure 2:
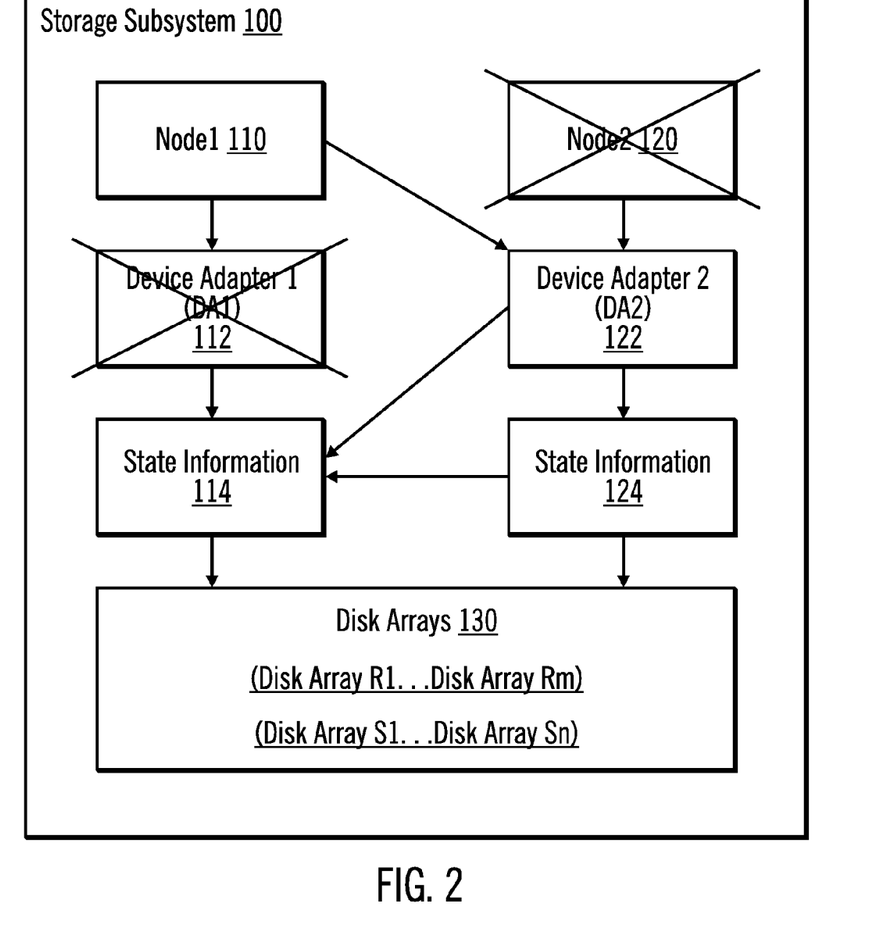
FIG. 2 illustrates, in a block diagram, a storage subsystem when a node becomes unavailable in accordance with certain alternative embodiments.

FIG. 2 illustrates, in a block diagram, a storage subsystem 100 when a node becomes unavailable in accordance with certain alternative embodiments. In FIG. 2, node 2 120 and DA1 112 become unavailable (i.e., these are said to be fenced or failed) and the affinity of DA2 122 (i.e., an available device adapter) moves from node2 120 (i.e., an unavailable node) to node1 110 (i.e., an available node). With this transition:

On node1 110, the state information 124 of DA2 is the same as it was on node2 120.

On node1 110, each disk array owned by node1 110 is now owned by device adapter DA2 122.

On node1 110, the state information 124 for the second subset of disk arrays of the unavailable node2 112 is added to the state information 112 for the first subset of disk arrays of the available node1 110. Thus, the updated state information 112 includes the state of the first subset of disk arrays and the second subset of disk arrays. The state information 112 configured for the available node1 110 is immediately accessible, which makes the second subset of disk arrays (and the first subset of disk arrays) immediately accessible via the available DA2 122.

The state information change happens as soon as the device adapter changes node affinity, and there is no need for the new device adapter to establish itself on the new node. The state information is preserved on the new node so that when the device adapter affinity changes again, the state information is carried forward to each subsequent, new node.

Figure 3:
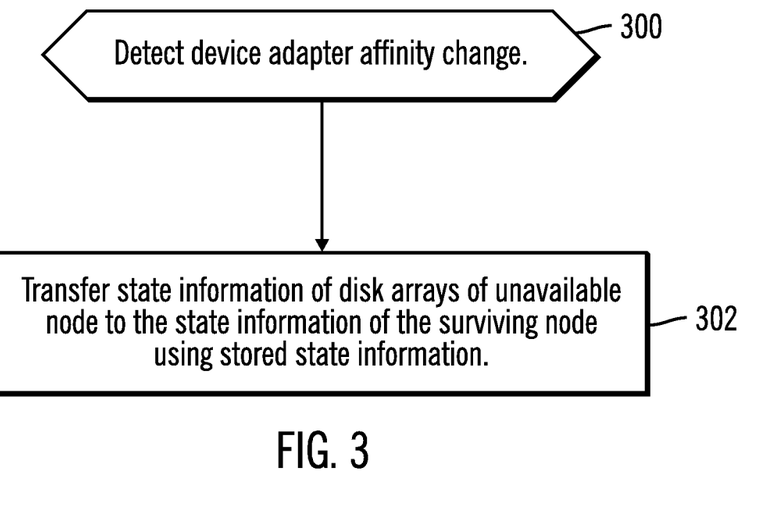
FIG. 3 illustrates, in a flow diagram, operations for processing state changes in accordance with certain embodiments.

FIG. 3 illustrates, in a flow diagram, operations for processing state changes in accordance with certain embodiments. Control begins at block 300 with the storage subsystem 100 detecting a device adapter affinity change. For example, the storage system 100 would detect the affinity change of DA2 122 from node2 120 to node1 110 with reference to the example in FIG. 2. In block 302, the storage subsystem 100 transfers (e.g., copies) state information of disk arrays of the unavailable node to the state information of the available node using the stored state information. For example, with reference to the example of FIG. 2, DA1 112 is the unavailable device adapter, and DA2 122 is the device adapter changing affinity, and the state information 124 of the second subset of disk arrays managed by DA1 112 is copied to the state information 114.

Thus, when the storage subsystem 100 determines that one of the two nodes is unavailable (e.g., failed) and also the available node's device adapter is unavailable (e.g., failed) then the available device adapter carries the state of its disk arrays over to the available node arrays. In other words, the available node's disk arrays will have the same state that the unavailable node's disk arrays had because the unavailable node's device adapter is now owned by the available node.

Figure 4:
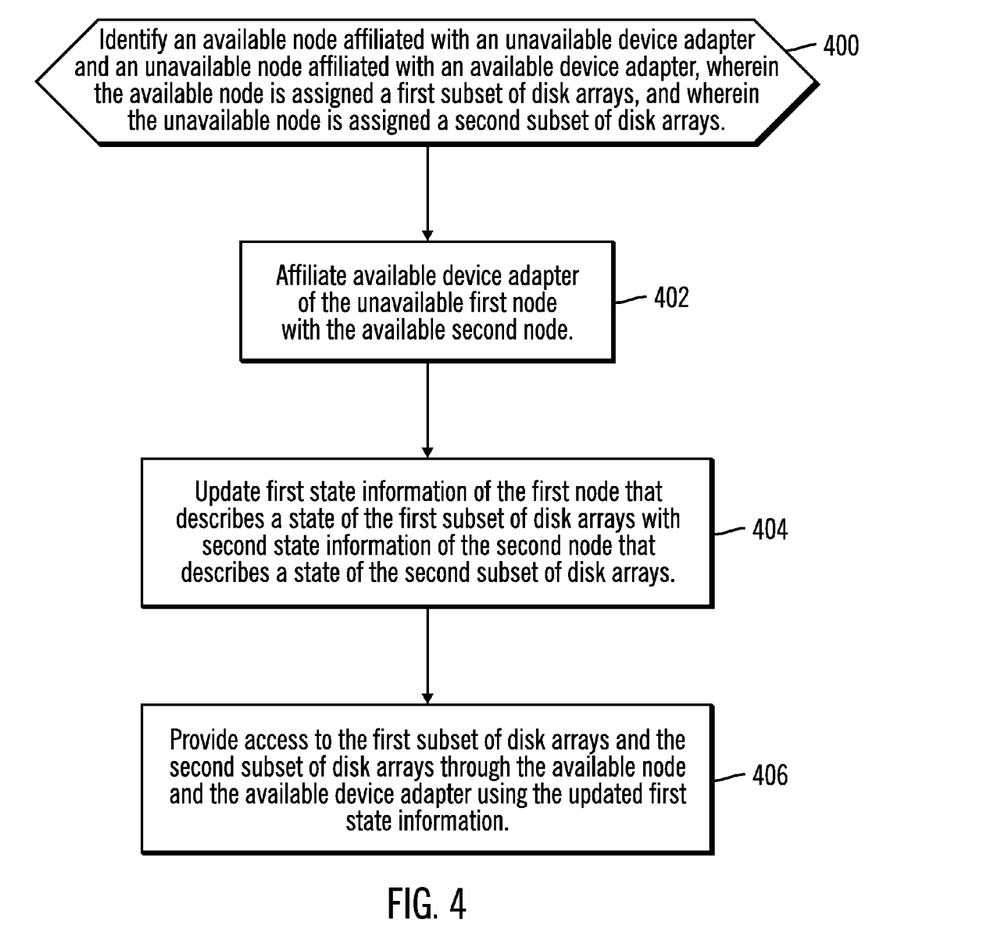
FIG. 4 illustrates, in a flow diagram, operations for a transition from a first node to a second node in accordance with certain embodiments.

FIG. 4 illustrates, in a flow diagram, operations for a transition from a first node to a second node in accordance with certain embodiments. Control begins at block 400 with a storage subsystem 100 identifying an available node affiliated with an unavailable device adapter and an unavailable node affiliated with an available device adapter, wherein the available node is assigned a first subset of disk arrays, and wherein the unavailable node is assigned a second subset of disk arrays. In block 402, the available device adapter of the unavailable, first node affiliates with the available, second node. In block 404, the storage subsystem 100 updates first state information of the first node (that describes a state of the first subset of disk arrays) with second state information of the second node (that describes a state of the second subset of disk arrays). In certain embodiments, the updating includes transferring the second state information from the unavailable first node to the available second node. At this point, the available node has state information for both the first subset of disk arrays and for the second subset of disk arrays (which were previously owned by the unavailable second node). In block 406, the storage subsystem 100 provides access to the first subset of disk arrays and the second subset of disk arrays through the available node and the available device adapter using the updated first state information.

Embodiments prevent loss of access when a device adapter's affinity to a node changes. Embodiments prevent loss of access to volumes by preserving a device adapter's state on old node and carrying that state forward to the new node. The disk array state for the disk arrays on this device adapter is also carried over. Hence, at all times, disk arrays on a given device adapter are accessible, and there is no loss of access to the disk arrays.

Embodiments preserve the device adapter and device array state on each node. For example, when a node fails, a device adapter having an affinity to the unavailable node may move from the unavailable node to another (new) node. When that happens, the device adapter state on the unavailable node is carried over to the new node. The underlying device array state is also carried over to the new node. These states are then preserved on the new node. Host I/O continues to run to the volumes on this device adapter, even though the device adapter is now on a new node. This device adapter transition to a new node is transparent from the host I/O perspective.

Embodiments avoid any additional queries to determine device adapter and disk array state when the device adapter moves to a new node. Embodiments close any windows that cause loss of access, hence, embodiments are reliable.

Embodiments provide a multi-node (host) data storage system in which the state information regarding the storage affinity through device adapters is constantly communicated between the nodes, so that, should a node fail, another node has all the needed information including the current state information on the state of the disk arrays of each other node.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, an application specific integrated circuit (ASIC), a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 5:
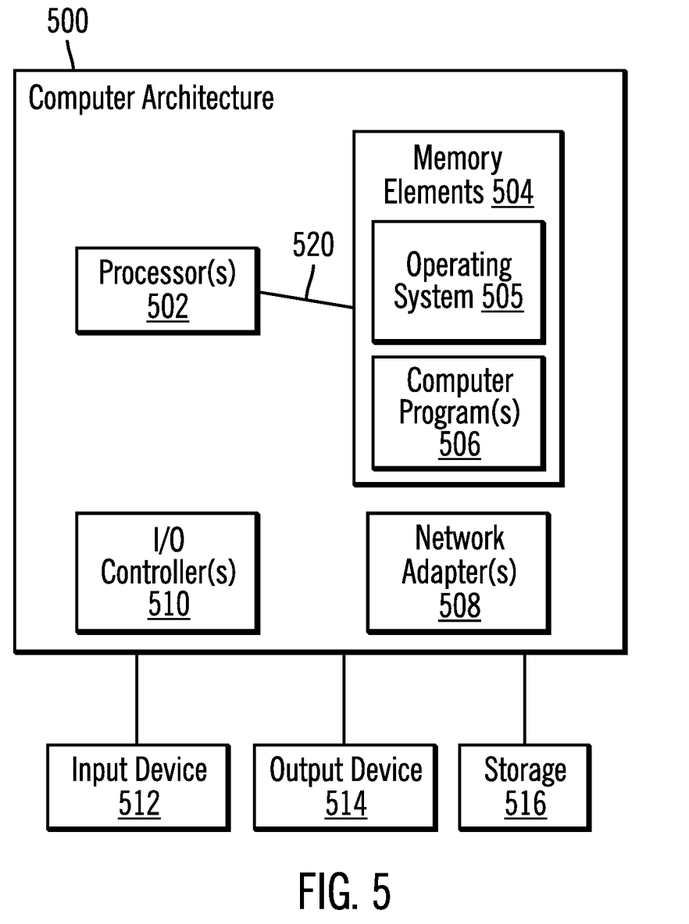
FIG. 5 illustrates, in a block diagram, a computer architecture that may be used in accordance with certain embodiments.

FIG. 5 illustrates a computer architecture 500 that may be used in accordance with certain embodiments. In certain embodiments, the storage subsystem 100 and/or each node 110, 120 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., any type of storage device; a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for maintaining state information, comprising:
identifying, with a processor of a computer, an available node affiliated with an unavailable device adapter and an unavailable node affiliated with an available device adapter, wherein the available node is assigned a first subset of disk arrays, and wherein the unavailable node is assigned a second subset of disk arrays;
affiliating the available device adapter with the available node;
updating first state information of the available node that describes a state of the first subset of disk arrays with second state information of the unavailable node that describes a state of the second subset of disk arrays, wherein the available node and the unavailable node are part of a storage subsystem, and wherein the storage subsystem transfers the second state information from the unavailable node to the available node so that the available node includes the first state information and the second state information; and
providing access to the first subset of disk arrays and the second subset of disk arrays through the available node and the available device adapter using the updated first state information.

2. The method of claim 1, wherein the second state information includes information on a state of the available device adapter.

3. The method of claim 1, further comprising:
detecting a change in affiliation of the available device adapter from the unavailable node to the available node.

4. The method of claim 1, wherein the first state information indicates for each disk array in the first subset of disk arrays whether that disk array is one of accessible, inaccessible, offline, and unconfigured, and wherein the second state information indicates for each disk array in the second subset of disk arrays whether that disk array is one of accessible, inaccessible, offline, and unconfigured.

5. The method of claim 1, wherein the second subset of disk arrays are accessible without loss of access.

6. The method of claim 1, wherein the unavailable node and the unavailable device adapter have failed.

7. A computer program product for maintaining state information, the computer program product comprising:
a non-transitory computer readable storage medium having computer readable program code embodied therein, the computer readable program code, when executed by at least one processor of a computer, is configured to perform:
identifying an available node affiliated with an unavailable device adapter and an unavailable node affiliated with an available device adapter, wherein the available node is assigned a first subset of disk arrays, and wherein the unavailable node is assigned a second subset of disk arrays;
affiliating the available device adapter with the available node;
updating first state information of the available node that describes a state of the first subset of disk arrays with second state information of the unavailable node that describes a state of the second subset of disk arrays, wherein the available node and the unavailable node are part of a storage subsystem, and wherein the storage subsystem transfers the second state information from the unavailable node to the available node so that the available node includes the first state information and the second state information; and
providing access to the first subset of disk arrays and the second subset of disk arrays through the available node and the available device adapter using the updated first state information.

8. The computer program product of claim 7, wherein the second state information includes information on a state of the available device adapter.

9. The computer program product of claim 7, wherein the computer readable program code, when executed by the at least one processor of the computer, is configured to perform:
detecting a change in affiliation of the available device adapter from the unavailable node to the available node.

10. The computer program product of claim 7, wherein the first state information indicates for each disk array in the first subset of disk arrays whether that disk array is one of accessible, inaccessible, offline, and unconfigured, and wherein the second state information indicates for each disk array in the second subset of disk arrays whether that disk array is one of accessible, inaccessible, offline, and unconfigured.

11. The computer program product of claim 7, wherein the second subset of disk arrays are accessible without loss of access.

12. The computer program product of claim 7, wherein the unavailable node and the unavailable device adapter have failed.

13. A computer system for maintaining state information, comprising:
at least one processor; and
a storage device coupled to the at least one processor, wherein the storage device has stored thereon a program, and wherein the at least one processor is configured to execute instructions of the program to perform operations, wherein the operations comprise:
identifying an available node affiliated with an unavailable device adapter and an unavailable node affiliated with an available device adapter, wherein the available node is assigned a first subset of disk arrays, and wherein the unavailable node is assigned a second subset of disk arrays;
affiliating the available device adapter with the available node;
updating first state information of the available node that describes a state of the first subset of disk arrays with second state information of the unavailable node that describes a state of the second subset of disk arrays, wherein the available node and the unavailable node are part of a storage subsystem, and wherein the storage subsystem transfers the second state information from the unavailable node to the available node so that the available node includes the first state information and the second state information; and
providing access to the first subset of disk arrays and the second subset of disk arrays through the available node and the available device adapter using the updated first state information.

14. The computer system of claim 13, wherein the second state information includes information on a state of the available device adapter.

15. The computer system of claim 13, wherein the operations further comprise:
detecting a change in affiliation of the available device adapter from the unavailable node to the available node.

16. The computer system of claim 13, wherein the first state information indicates for each disk array in the first subset of disk arrays whether that disk array is one of accessible, inaccessible, offline, and unconfigured, and wherein the second state information indicates for each disk array in the second subset of disk arrays whether that disk array is one of accessible, inaccessible, offline, and unconfigured.

17. The computer system of claim 13, wherein the second subset of disk arrays are accessible without loss of access.

18. The computer system of claim 13, wherein the unavailable node and the unavailable device adapter have failed.

* * * * *